(12) United States Patent
Jiang et al.

(10) Patent No.: US 7,579,590 B2
(45) Date of Patent: Aug. 25, 2009

(54) METHOD OF MEASURING THIN LAYERS USING SIMS

(75) Inventors: Zhi-Xiong (Jack) Jiang, Austin, TX (US); David D. Sieloff, Georgetown, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 226 days.

(21) Appl. No.: 11/888,576

(22) Filed: Aug. 1, 2007

(65) Prior Publication Data

US 2009/0032704 A1 Feb. 5, 2009

(51) Int. Cl.
*G01N 23/225* (2006.01)
*H01L 21/66* (2006.01)

(52) U.S. Cl. .............. 250/309; 250/492.21; 250/492.3; 257/E27.001; 257/E23.041; 257/E23.134; 257/E23.173; 257/E21.021; 438/14; 438/624; 438/763

(58) Field of Classification Search ......... 250/306–309, 250/492.1, 492.2, 492.21, 492.3; 438/14, 438/18, 478, 479, 495, 499, 508, 514, 517, 438/624, 761–763; 257/E27.001, E27.01, 257/E27.011, E27.013, E23.041, E23.134, 257/E23.173, E21.001, E21.021, E21.043, 257/E21.057, E21.119
See application file for complete search history.

(56) References Cited

U.S. PATENT DOCUMENTS

| 6,133,746 | A  | 10/2000 | Fang et al. |
| 6,228,665 | B1 | 5/2001  | Griffith et al. |
| 6,456,105 | B1 | 9/2002  | Tao |
| 6,646,752 | B2 | 11/2003 | Chen et al. |
| 6,727,995 | B1 | 4/2004  | Halliyal et al. |
| 6,731,130 | B1 | 5/2004  | Yang et al. |
| 6,885,466 | B1 | 4/2005  | Komura et al. |
| 6,895,360 | B2 | 5/2005  | Liu et al. |

OTHER PUBLICATIONS

Brox, O. et al.; "Determination of silicon oxide layer thickness by time-of-flight secondary ion mass spectroscopy"; J. Vac. Sci. Technol. B 17(5), Sep./Oct. 1999; pp. 2191-2192.

Cole, D.A. et al.; "SiO2 thickness determination by x-ray photoelectron spectroscopy, secondary ion mass spectrometry, Rutherform backscattering, transmission electron microscopy, and ellipsometry"; J. Vac. Sci. Technol. B 18(1); Jan./Feb. 2000; pp. 440-444.

Chang, H.S. et al.; "Measurement of the physical and electrical thickness of ultrathin gate oxides"; J. Vac Sci. Technol. B 20(5), Sep./Oct. 2002; pp. 1836-1842.

*Primary Examiner*—Bernard E Souw
(74) *Attorney, Agent, or Firm*—John A. Fortkort; Fortkort & Houston P.C.

(57) ABSTRACT

A method for measuring the thickness of a layer is provided, comprising (a) providing a structure (101) comprising a first layer disposed on a second layer; (b) impinging (103) the structure with a first ion beam comprising a first isotope, thereby sputtering off a portion of the first layer which contains a second isotope and exposing a portion of the second layer; and (c) determining (105) the thickness of the first layer by measuring the amount of the second isotope which is sputtered off.

20 Claims, 4 Drawing Sheets

METHOD OF MEASURING THIN LAYERS USING SIMS

FIELD OF THE DISCLOSURE

The present disclosure relates generally to methods for determining film thickness, and more particularly to methods for utilizing Secondary Ion Mass Spectrometry (SIMS) to determine film thickness.

BACKGROUND OF THE DISCLOSURE

As the size of semiconductor devices continues to shrink, it has been necessary for the thickness of the dielectric layers utilized in these devices to shrink as well. Consequently, the accurate measurement of the thickness of dielectric films has become an important aspect of microelectronic device development, simulation, and manufacturing.

Currently, various techniques are known to the art for measuring film thicknesses. These include Transmission Electron Microscopy (TEM), X-ray Photoelectron Spectroscopy (XPS), medium-energy ion scattering spectrometry (MEIS), Rutherford Backscattering Spectrometry (RBS), Secondary Ion Mass Spectrometry (SIMS), Auger Electron Spectroscopy (AES), and ellipsometry. However, when film thicknesses fall below about 20 Å (as is frequently the case with currently emerging technologies), the accuracy with which these thicknesses may be measured is a challenge for existing measurement techniques.

There is thus a need in the art for methods and devices for measuring film thicknesses, and especially those of thin film dielectric layers. In particular, there is a need in the art for a method for accurately measuring the thickness of dielectric films (such as $SiO_2$ films) when the thickness of those films falls below 20 Å. These and other needs may be met by the devices and methodologies disclosed herein.

DETAILED DESCRIPTION

Figure 2:
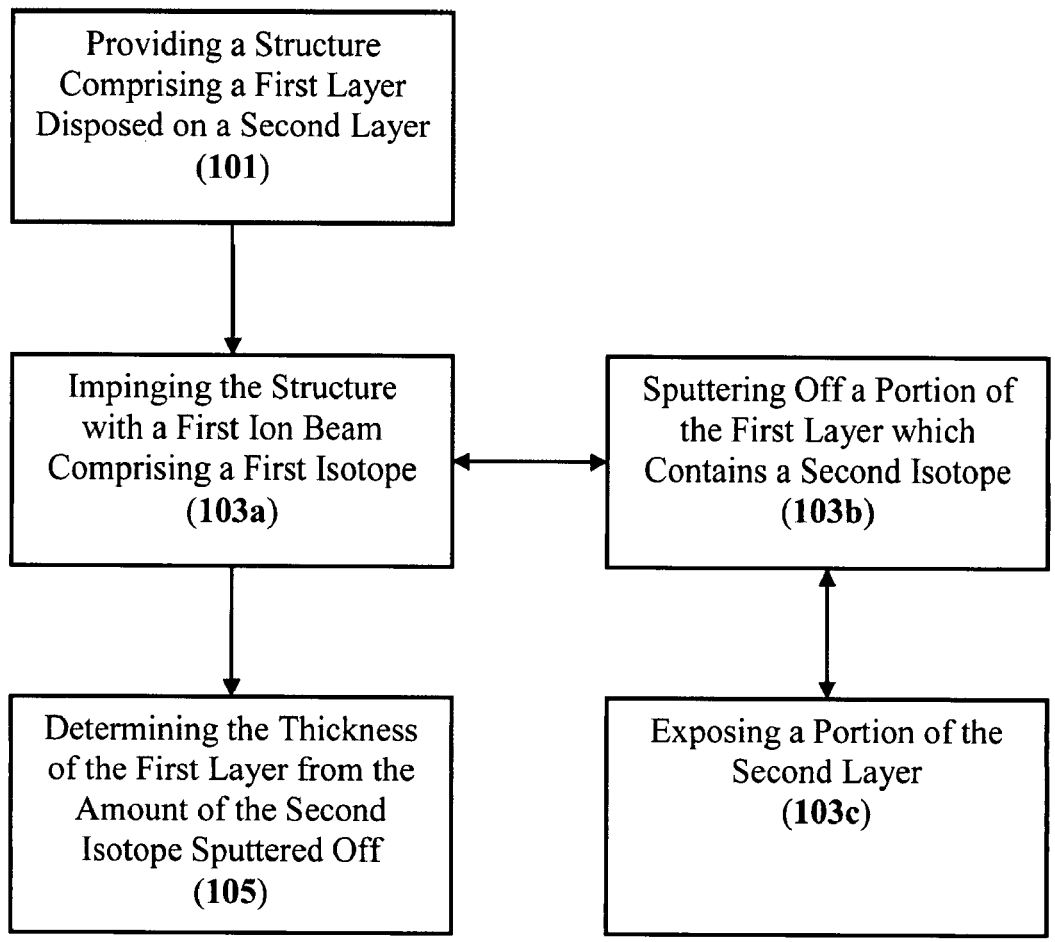
FIG. 2 is a flowchart of an embodiment of a process in accordance with the teachings herein.

In one aspect, a method for measuring the thickness of a layer is provided. In accordance with the method (which is depicted in the flowchart of FIG. 2), a structure is provided 101 which comprises a first layer disposed on a second layer. The structure is impinged 103a with a first ion beam comprising a first isotope, thereby sputtering off 103b a portion of the first layer which contains a second isotope and exposing 103c a portion of the second layer. The thickness of the first layer is then determined 105 by measuring the amount of the second isotope which is sputtered off.

Figure 3:
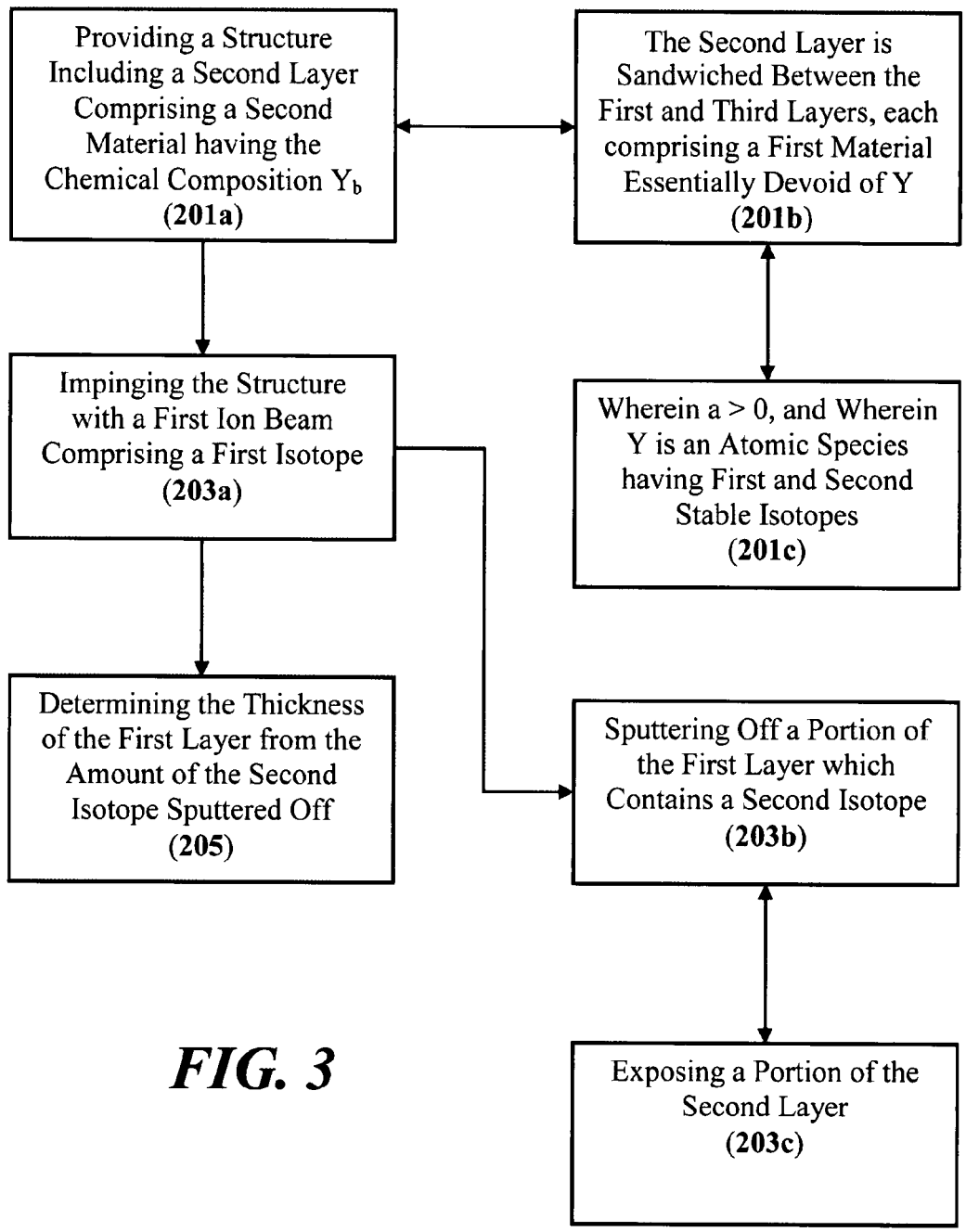
FIG. 3 is a flowchart of an embodiment of a process in accordance with the teachings herein.

In another aspect, a method for measuring the thickness of a layer is provided. In accordance with the method (which is depicted in the flowchart of FIG. 3), a structure is provided 201a which includes a second layer 201b comprising a second material having the chemical composition $Y_a$ which is sandwiched between first and third layers, each comprising a first material which is essentially devoid of Y. The composition of the second layer is such 201c that a>0, and Y is an atomic species having first and second stable isotopes. The structure is impinged 203a with a first ion beam of the first stable isotope such that a portion of the first and second layers are sputtered off 203b and a portion of the third layer is exposed 203c. The thickness of the second layer is then determined 205 from the amount of the second isotope sputtered off.

Figure 4:
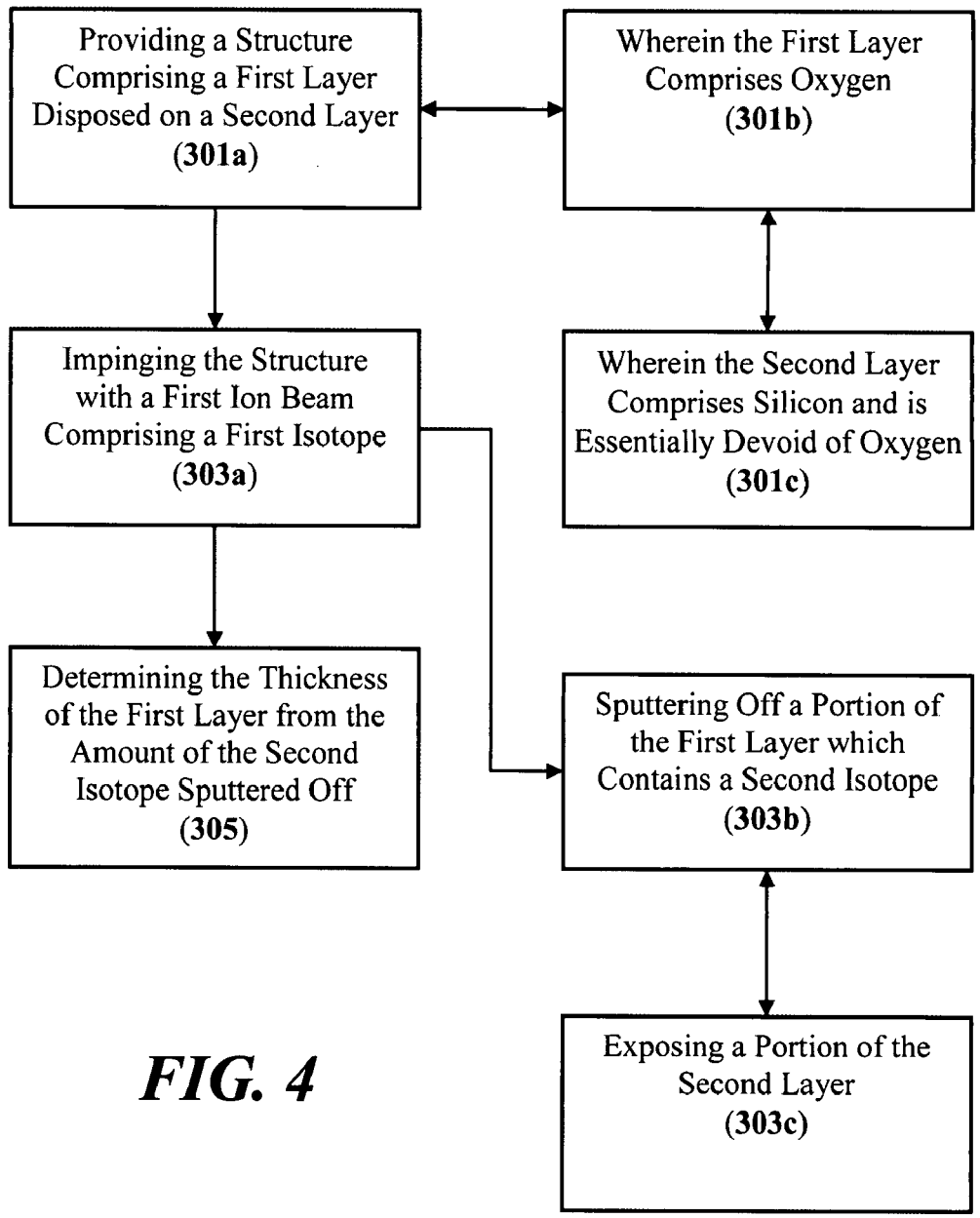
FIG. 4 is a flowchart of an embodiment of a process in accordance with the teachings herein.

In a further aspect, a method for measuring the thickness of a layer is provided. In accordance with the method (which is depicted in the flowchart of FIG. 4), a structure is provided 301a which comprises a first layer disposed on a second layer, wherein the first layer 301b comprises oxygen, and wherein the second layer comprises silicon and is essentially devoid of oxygen 301c. The structure is impinged 303a with a first ion beam comprising a first isotope, thereby sputtering off 303b a portion of the first layer which contains a second isotope and exposing 303c a portion of the second layer. The thickness of the first layer is then determined 305 by measuring the amount of the second isotope which is sputtered off.

Recently, Secondary Ion Mass Spectrometry (SIMS) has evolved in the art as a highly sensitive tool for analyzing $SiO_2$ dielectric layer thicknesses. In this technique, a surface to be tested is bombarded with a beam of primary ions. The surface then emits secondary ions, which are identified with a mass spectrometer to provide compositional information about the surface.

SIMS may also be utilized to obtain profiles of elemental concentrations as a function of depth. Such depth profiling may be used to determine the thickness of $SiO_2$ dielectric layers. For example, the thickness of the dielectric layer can be determined with SIMS by measuring the exact position of the dielectric layer/substrate interface during SIMS depth profiling with cesium ($Cs^+$) primary ions. This interface is indicated by abrupt changes in the intensities of characteristic secondary ions, such as $Si^-$, $SiO^-$ and $SiO_2^-$, when the interface is reached. These changes result from the composition changes and differences in the sputter yields and ionization probabilities attendant to compositional changes at the interface.

Although SIMS has many obvious advantages, the use of this technique for measuring very thin layers of $SiO_2$ and other dielectrics is hindered by the matrix effect. The matrix effect arises from the fact that ionization rates of atoms are highly dependant on their chemical environment within the material being analyzed. Consequently, as the lower limits of layer thicknesses are approached and measurements are made of the signal of an ion consisting essentially of one matrix atom, this signal is generally not proportional to elemental concentrations as would be the case with thicker layers.

It has now been found that the aforementioned problem may be overcome in SIMS depth profiling by utilizing a primary ion beam comprising a first isotopic species at normal (or near normal) incidence to profile a film, and then measuring the total amount of a second isotopic species, having a different atomic weight from the first isotopic species and present in the secondary ion beam, to determine film thickness. Thus, in one preferred embodiment in accordance with the teachings herein which may be utilized to determine the thickness of an $SiO_2$ film deposited on an Si substrate, an $^{18}O_2^+$ primary beam is utilized, and the total amount of $^{16}O^-$ in a secondary beam is measured to determine film thickness. In an alternate (but also preferred) embodiment which may be utilized for this purpose, a $^{16}O_2^+$ primary beam is used, and the total amount of $^{18}O^-$ in the secondary beam is measured to determine film thickness.

The methodologies described herein are preferably utilized to determine the thickness of a first layer comprising a first material which is disposed on a substrate (or on a second layer) comprising a second material. The first and second materials are preferably related such that the second material can be converted into the first material through exposure to an ion beam. Thus, for example, the first material may be an oxide of the second material. The isotopic species utilized in the primary ion beam is preferably selected such that, when it impinges on the second material, it converts the second material into the first material. Thus, for example, if the first material is $SiO_2$ and the second material is Si, then the isotopic species utilized in the primary beam is preferably oxygen.

Without wishing to be bound by theory, it is believed that this approach eliminates the matrix effect, since the chemistry of the layer being exposed to SIMS analysis remains the same (due to the aforementioned conversion) as one approaches and crosses the interlayer interface. Thus, for example, in the case of an $Si/SiO_2/Si$ film structure, the Si layers are converted to $SiO_2$ as they are impinged with the primary ion beam. As each portion of each of the Si layers is impinged, it is converted to $SiO_2$ and is sputtered away. However, the chemistry of the $SiO_2$ layer originally present in the film sample is unaffected by impingement of the primary ion beam. Hence, as the process advances through a sample of the film, the material being sputtered is always $SiO_2$.

It is also believed that the use of a normal, or near normal, angle of incidence is also important in that it facilitates complete conversion of the second material into the first material, thus ensuring that the chemistry of materials sputtered off of the sample remains unchanged across the interface (and ensuring that the matrix effect is eliminated). Due to the elimination of the matrix effect, this approach may be used to measure thin films, such as dielectric films in semiconductor structures, with a higher degree of accuracy than that obtainable with conventional SIMS approaches or other methodologies currently known to the art.

Figure 1:
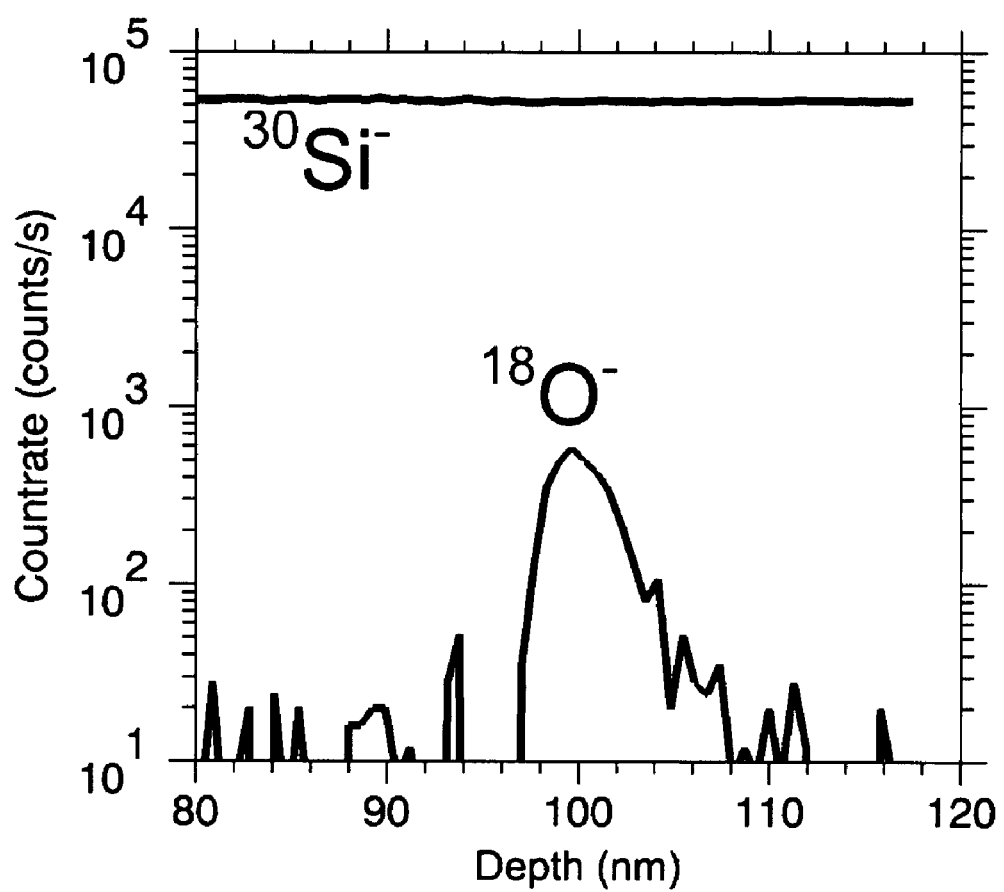
FIG. 1 is a graph of count rate of Si and O secondary ions as a function of depth.

The methodologies disclosed herein may be further appreciated with respect to the graph depicted in FIG. 1, which depicts the SIMS profile analysis of an $SiO_2$ layer sandwiched between two Si layers. This graph depicts the abundance of the noted isotopic species as a function of depth. The profile was conducted using a $^{16}O_2^+$ primary ion beam at normal incidence.

As seen therein, the signal intensity of the secondary $^{30}Si^-$ ion beam remained constant across the profile, thus indicating the absence of a matrix effect (e.g., the $^{30}Si^-$ signal was not affected by the environment (Si layer versus $SiO_2$ layer) that the silicon was being sampled from). On the other hand, the appearance of the $^{18}O^-$ signal indicates that the $Si/SiO_2$ interface has been reached, since the use of $^{16}O_2^+$ in the primary ion beam ensures that only $^{16}O^-$ ions are sputtered off while the profile is proceeding through the Si layers. However, when the $SiO_2$ layer is reached, the natural abundance of the $^{18}O$ isotope in the dielectric layer gives rise to the $^{18}O^-$ signal. The $^{18}O^-$ signal disappears again when the $SiO_2/Si$ interface is reached.

Through the use of quantification techniques which are commonly utilized in conventional SIMS analyses, the intensity of $^{18}O^-$ can be converted into the atomic concentration of oxygen. These techniques typically incorporate an appropriate calibration procedure using an implant standard as described, for example, in FIG. 4 of U.S. Pat. No. 6,248,603 (Jones et al.) The total number of oxygen atoms D in a unit area (typically $cm^2$) can then be found by integrating the atomic concentration of oxygen across the peak as show in Equation 1 below:

$$D = \int_{x_1}^{x_2} Co(x)dx \quad \text{(EQUATION 1)}$$

where Co(x) is the oxygen atomic concentration at depth x, $x_1$ is the starting position of the oxygen peak, and $x_2$ is the end position of the oxygen peak. The thickness T of the corresponding $SiO_2$ film can then be determined from the total amount of oxygen and the atomic density of oxygen inside $SiO_2$, which is known to be 4.6E22 atoms/$cm^3$:

$$T(cm) = \frac{D}{4.6E22} \quad \text{(EQUATION 2)}$$

Note that the total dose of oxygen is here used to determine the thickness of oxide. A conventional method of measuring the thickness based on the interface between the oxide and Si would experience a large error due to a strong atomic mixing caused by bombardment of energetic primary ions resulting in significant broadening of the measured profile and associated uncertainty in determining the interface between a thin oxide and Si (see FIG. 1) It will be appreciated that, while this particular example involved an $Si/SiO_2/Si$ structure, the methodology would work equally well with an $SiO_2/Si$ structure or an $Si/SiO_2$ structure, though the location of the $^{18}O^-$ signal in the profile might be different. It will also be appreciated that $^{18}O_2^+$ could have been used in the primary ion beam, in which case the $^{16}O^-$ signal could be used for integration.

Various materials may be used in the devices and methodologies taught herein. The material used in the primary ion beam is preferably a material having at least two distinct stable isotopes, since this allows the ions of the primary ion beam to be distinguished (by way of mass spectrometry) from ions in the secondary ion beam which have been sputtered off of the substrate. It is also preferred that the primary ion beam is positively charged (that is, that the primary ion beam comprises cations) and that the secondary ion beam is negatively charged (that is, that the primary ion beam comprises anions), though embodiments are possible in accordance with the teachings herein in which the opposite is true.

Moreover, when the methodology disclosed herein is utilized to determine the thickness of a first layer comprising a first material which is disposed on a second layer comprising a second material, it is preferred that the second material can be converted to the first material through exposure to the first ion beam, since this eliminates the matrix effect. Thus, for example, if the first layer comprises $SiO_2$ and the second layer comprises Si, then a first stable isotope of oxygen may be used in the primary ion beam (this may be $^{16}O$, $^{17}O$ or $^{18}O$), and the thickness of the first layer may be ascertained from the signal obtained for a secondary ion beam of a second stable isotope of oxygen (distinct from the first isotope). In particular, if a $^{16}O_2^+$ primary beam is utilized, then the amount of $^{18}O^-$ in a secondary beam may be ascertained to determine film thickness (it is less preferred to use secondary $^{17}O^-$ ions for this purpose, due to the strong mass interference which can occur from $^{16}O^1H^-$).

Likewise, if a $^{17}O_2^+$ primary beam is utilized, then the amount of $^{16}O^-$ or $^{18}O^-$ in a secondary beam may be ascertained to determine film thickness. Similarly, if a $^{18}O_2^+$ primary beam is utilized, then the amount of $^{16}O^-$ in a secondary beam may be ascertained to determine film thickness. Analogous embodiments are possible wherein the second layer comprises In, Ge, or SiGe, and the first layer comprises oxides or nitrides of the material of the second layer or comprises other materials chemically related to the material of the second layer.

It will be appreciated that the methodology disclosed herein is not limited to the use of oxygen isotopes in the primary beam. Thus, for example, if the layer whose thickness is to be determined is SiN which is adjacent to an Si layer or substrate, then the primary ion beam may comprise a first stable isotope of nitrogen ($^{14}N$ or $^{15}N$), and the total amount of the other stable isotope may be ascertained to determine film thickness. It will also be appreciated that the methodology disclosed herein is not limited to semiconductor materials. Thus, for example, if the layer whose thickness is to be determined is $AlO_3$ which is disposed adjacent to an Al layer or substrate, then the primary ion beam may comprise a first stable isotope of oxygen ($^{16}O$, $^{17}O$ or $^{18}O$), and the total amount of a different stable isotope may be ascertained to determine film thickness. TABLE 1 below lists some stable isotopes that may be used in various embodiments of the methodologies disclosed herein.

dence is utilized. The energy of the primary beam may vary, and may depend on the application and the ionic species of interest. Typically, the energy of the primary beam is in the range of about 100 eV to about 10,000 eV, and preferably, the energy of the primary beam is in the range of about 500 eV to about 5,000 eV The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for measuring the thickness of a layer, comprising:
   providing a structure comprising a first layer disposed on a second layer;
   impinging the structure with a first ion beam comprising a first isotope of an element, thereby sputtering off a portion of the first layer which contains a second isotope of the same element but different than the first isotope and exposing a portion of the second layer; and
   determining the thickness of the first layer by measuring the amount of the second isotope which is sputtered off.

TABLE 1

Stable Isotopes

| Element | Stable Isotopes | Element | Stable Isotopes | Element | Stable Isotopes |
|---|---|---|---|---|---|
| Hydrogen | $^1H, ^2H$ | Nickel | $^{58}Ni, ^{60}Ni, ^{61}Ni, ^{62}Ni, ^{64}Ni$ | Xenon | $^{126}Xe, ^{128}Xe, ^{129}Xe, ^{130}Xe, ^{131}Xe, ^{132}Xe, ^{134}Xe, ^{136}Xe$ |
| Helium | $^3He, ^4He$ | Copper | $^{63}Cu, ^{65}Cu$ | Barium | $^{130}Ba, ^{132}Ba, ^{134}Ba, ^{135}Ba, ^{136}Ba, ^{137}Ba, ^{138}Ba$ |
| Lithium | $^6Li, ^7Li$ | Zinc | $^{64}Zn, ^{66}Zn, ^{67}Zn, ^{68}Zn, ^{70}Zn$ | Cerium | $^{138}Ce, ^{140}Ce$ |
| Boron | $^{10}B, ^{11}B$ | Gallium | $^{69}Ga, ^{71}Ga$ | Neodymium | $^{142}Nd, ^{143}Nd, ^{145}Nd, ^{146}Nd, ^{148}Nd$ |
| Carbon | $^{12}C, ^{13}C$ | Germanium | $^{70}Ge, ^{72}Ge, ^{73}Ge, ^{74}Ge$ | Samarium | $^{144}Sm, ^{150}Sm, ^{152}Sm, ^{154}Sm$ |
| Nitrogen | $^{14}N, ^{15}N$ | Selenium | $^{74}Se, ^{76}Se, ^{77}Se, ^{78}Se, ^{80}Se$ | Europium | $^{151}Eu, ^{153}Eu$ |
| Oxygen | $^{16}O, ^{17}O, ^{18}O$ | Bromine | $^{79}Br, ^{81}Br$ | Gadolinium | $^{154}Gd, ^{155}Gd, ^{156}Gd, ^{157}Gd, ^{158}Gd, ^{160}Gd$ |
| Neon | $^{20}Ne, ^{21}Ne, ^{22}Ne$ | Krypton | $^{80}Kr, ^{82}Kr, ^{83}Kr, ^{84}Kr, ^{86}Kr$ | Dysprosium | $^{156}Dy, ^{158}Dy, ^{160}Dy, ^{161}Dy, ^{162}Dy, ^{163}Dy, ^{164}Dy$ |
| Magnesium | $^{24}Mg, ^{25}Mg, ^{26}Mg$ | Strontium | $^{84}Sr, ^{86}Sr, ^{87}Sr, ^{88}Sr$ | Erbium | $^{162}Er, ^{163}Er, ^{164}Er, ^{166}Er, ^{167}Er, ^{168}Er$ |
| Silicon | $^{28}Si, ^{29}Si, ^{30}Si$ | Zirconium | $^{90}Zr, ^{91}Zr, ^{92}Zr, ^{94}Zr$ | Ytterbium | $^{168}Yb, ^{170}Yb, ^{171}Yb, ^{172}Yb, ^{173}Yb, ^{174}Yb, ^{176}Yb$ |
| Sulpher | $^{33}S, ^{34}S, ^{36}S$ | Molybdenum | $^{92}Mo, ^{94}Mo, ^{95}Mo, ^{96}Mo, ^{97}Mo, ^{98}Mo$ | Hafnium | $^{176}Hf, ^{177}Hf, ^{178}Hf, ^{179}Hf, ^{180}Hf$ |
| Chlorine | $^{35}Cl, ^{37}Cl$ | Ruthenium | $^{96}Ru, ^{98}Ru, ^{99}Ru, ^{100}Ru, ^{101}Ru, ^{102}Ru, ^{104}Ru$ | Tungsten | $^{182}W, ^{183}W, ^{184}W, ^{186}W$ |
| Argon | $^{36}Ar, ^{38}Ar, ^{40}Ar$ | Palladium | $^{102}Pd, ^{104}Pd, ^{105}Pd, ^{106}Pd, ^{108}Pd, ^{110}Pd$ | Osmium | $^{187}Os, ^{188}Os, ^{189}Os, ^{190}Os, ^{192}Os$ |
| Potassium | $^{39}K, ^{41}K$ | Silver | $^{107}Ag, ^{109}Ag$ | Iridium | $^{191}Ir, ^{193}Ir$ |
| Calcium | $^{40}Ca, ^{42}Ca, ^{43}Ca, ^{44}Ca, ^{46}Ca$ | Cadmium | $^{106}Cd, ^{108}Cd, ^{110}Cd, ^{111}Cd, ^{112}Cd, ^{114}Cd$ | Platinum | $^{192}Pt, ^{194}Pt, ^{195}Pt, ^{196}Pt, ^{198}Pt$ |
| Titanium | $^{46}Ti, ^{47}Ti, ^{48}Ti, ^{49}Ti, ^{50}Ti$ | Tin | $^{112}Sn, ^{114}Sn, ^{115}Sn, ^{116}Sn, ^{117}Sn, ^{118}Sn, ^{119}Sn, ^{120}Sn, ^{122}Sn, ^{124}Sn$ | Mercury | $^{198}Hg, ^{199}Hg, ^{200}Hg, ^{201}Hg, ^{202}Hg, ^{204}Hg$ |
| Chromium | $^{52}Cr, ^{53}Cr, ^{54}Cr$ | Antimony | $^{121}Sb, ^{123}Sb$ | Thallium | $^{203}Tl, ^{205}Tl$ |
| Iron | $^{54}Fe, ^{56}Fe, ^{57}Fe, ^{58}Fe$ | Tellurium | $^{122}Te, ^{123}Te, ^{124}Te, ^{126}Te$ | Lead | $^{206}Pb, ^{207}Pb, ^{208}Pb$ |

As noted above, the angle of incidence used in the methodologies described herein are preferably normal or near-normal angles. Typically, these angles will be within ±20° of normality, preferably, these angles will be within ±10° of normality, and more preferably, these angles will be within ±5° of normality. Most preferably, a normal angle of inci- 2. The method of claim 1, wherein the first ion beam comprises ions of element Y, wherein the first layer comprises a first material having the chemical composition $X_a Y_b$ wherein a, b>0, wherein the second layer comprises a second material having the chemical composition $X_a$, and wherein X is either an element or a compound.

3. The method of claim 2, wherein the structure further comprises a third layer including a third material having the chemical composition $X_a$, and wherein the first layer is disposed between the second and third layers.

4. The method of claim 2, wherein Y is selected from the group consisting of oxygen and nitrogen, and wherein X is selected from the group consisting of silicon, germanium, SiGe, aluminum, and indium.

5. The method of claim 2, wherein X is silicon, and wherein Y is oxygen.

6. The method of claim 2, wherein $X_a$ is converted to $X_aY_b$ when it is impinged with the first ion beam.

7. The method of claim 2, wherein the first ion beam comprises cations, and wherein the portion of the first layer is sputtered off as a secondary ion beam comprising anions.

8. The method of claim 7, wherein the anions are anions of Y.

9. The method of claim 1, wherein the structure is impinged with the first ion beam at an angle of incidence within the range of about 70° to about 110°.

10. The method of claim 1, wherein the first and second isotopes are distinct and are selected from the group consisting of $^{16}O$ and $^{18}O$.

11. The method of claim 1, wherein the structure is impinged with the first ion beam at an angle of incidence within the range of about 85° to about 95°.

12. The method of claim 1, wherein the energy of the primary beam is within the range of about 100 eV to about 10,000 eV.

13. The method of claim 1, wherein the energy of the primary beam is within the range of about 500 eV to about 5,000 eV.

14. The method of claim 1, wherein the thickness of the first layer is no greater than 20 Å.

15. The method of claim 1, wherein the first layer is a gate dielectric.

16. The method of claim 1, wherein determining the thickness of the first layer comprises:

using mass spectroscopy to obtain a signal peak corresponding to the second isotope;

determining the atomic concentration of the second isotope from the signal peak; and determining D, the total number of atoms of the second isotope in a unit area of the sample, from the determined atomic concentration of the second isotope.

17. The method of claim 16, where D is determined from the equation $$D = \int_{x_1}^{x_2} Co(x)dx$$

wherein Co(x) is the atomic concentration of the second isotope at depth x, $x_1$ is the starting position of the signal peak, and $x_2$ is the end position of the signal peak, and wherein the thickness T of the corresponding layer is determined from the equation $$T(\text{cm}) = \frac{D}{d}$$

wherein d is the atomic density of the second isotope within the layer.

18. A method for measuring the thickness of a layer, comprising:

providing a structure including a second layer comprising a second material having the chemical composition $Y_b$, which is sandwiched between first and third layers, each comprising a first material which is essentially devoid of Y, (wherein b>0), and wherein Y is an atomic species having first and second stable but mutually different isotopes;

impinging the structure with a first ion beam of the first stable isotope such that a portion of the first and second layers are sputtered off and a portion of the third layer is exposed; and determining the thickness of the second layer from the amount of the second isotope sputtered off.

19. The method of claim 18, wherein the thickness of the first layer is no greater than 20 Å.

20. A method for measuring the thickness of a layer, comprising:

providing a structure comprising a first layer disposed on a second layer, wherein the first layer comprises oxygen, and wherein the second layer comprises silicon and is essentially devoid of oxygen;

impinging the structure with a first ion beam comprising a first isotope, thereby sputtering off a portion of the first layer which contains a second isotope different than the first isotope and exposing a portion of the second layer; and determining the thickness of the first layer by measuring the amount of the second isotope which is sputtered off.

* * * * *